United States Patent
Wardrop

(10) Patent No.: US 7,249,272 B1
(45) Date of Patent: Jul. 24, 2007

(54) APPARATUS AND METHOD FOR COORDINATING ACTIVITIES OF ONE OR MORE COMPUTERS

(75) Inventor: Andrew J. Wardrop, Lakeville, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 970 days.

(21) Appl. No.: 09/977,145

(22) Filed: Oct. 11, 2001

Related U.S. Application Data

(60) Provisional application No. 60/239,606, filed on Oct. 11, 2000.

(51) Int. Cl.
*G06F 1/12* (2006.01)

(52) U.S. Cl. .................. 713/400; 709/248; 709/237

(58) Field of Classification Search ............. 713/375, 713/500–503, 400; 709/200–253
See application file for complete search history.

(56) References Cited

U.S. PATENT DOCUMENTS

| | | | | |
|---|---|---|---|---|
| 4,611,153 A | * | 9/1986 | Wesling | 388/814 |
| 5,382,958 A | * | 1/1995 | FitzGerald | 342/386 |
| 5,748,144 A | * | 5/1998 | Rodal | 342/357.12 |
| 5,757,786 A | * | 5/1998 | Joo | 370/324 |
| 5,861,842 A | * | 1/1999 | Hitch et al. | 342/357.15 |
| 5,883,596 A | * | 3/1999 | Rodal | 342/357.12 |
| 5,953,384 A | * | 9/1999 | Walsh et al. | 375/354 |
| 6,031,488 A | * | 2/2000 | Hua et al. | 342/357.12 |
| 6,098,178 A | * | 8/2000 | Moretti et al. | 713/500 |
| 6,104,729 A | * | 8/2000 | Hellum et al. | 370/503 |
| 6,199,170 B1 | * | 3/2001 | Dietrich | 713/400 |
| 6,934,306 B1 | * | 8/2005 | Park | 370/517 |
| 6,952,789 B1 | * | 10/2005 | Azim et al. | 713/400 |
| 2002/0011949 A1 | * | 1/2002 | Rudow et al. | 342/357.06 |

* cited by examiner

*Primary Examiner*—Lewis A. Bullock, Jr.
(74) *Attorney, Agent, or Firm*—Steptoe & Johnson LLP

(57) ABSTRACT

A method and apparatus for coordinating the activities of multiple computers using a common reference point such as a Global Positioning System pulse-per-second signal. A reload register transmits a reload value to a mission timer. The mission timer generates an interrupt signal based upon the reload value. A timer capture register captures the countdown value of the mission timer when a pulse-per-second signal is asserted. Software generates new reload values based upon the countdown value captured by the timer capture register. Additional timer capture registers may be used to form a consensus value of the countdown value when the pulse-per-second signal is asserted. A local pulse-per-second signal generator may be used when a Global Positioning System pulse-per-second signal is not available.

19 Claims, 3 Drawing Sheets

APPARATUS AND METHOD FOR COORDINATING ACTIVITIES OF ONE OR MORE COMPUTERS

CROSS-REFERENCE TO RELATED APPLICATION

This application claims benefit of Provisional Application No. 60/239,606 filed Oct. 11, 2000 for "Method and Apparatus for Coordinating Activity in Multiple Computers Using GPS" by Andrew J. Wardrop.

BACKGROUND OF THE INVENTION

1. Field of the Invention

The present invention relates to coordinating the activities of multiple computers. Specifically, the present invention relates to coordinating the activities of multiple computers using a common reference time point such as a Global Positioning System one pulse-per-second signal.

2. Description of the Related Art

Conventional computer systems typically use a central source for generating global interrupt signals. These signals typically are generated by a high quality, but imperfect, clock source. Use of such global interrupt signals by conventional computer systems requires a physical connection among the systems to coordinate activities using the global interrupt signals.

There exists a continuing need for a way to coordinate the activities of multiple computers that are not physically connected to one another using a precise reference time point.

SUMMARY OF THE INVENTION

The present invention provides a method and apparatus for coordinating activity among multiple computers using a common reference time point such as a one pulse-per-second ("PPS") signal available from the Global Positioning System ("GPS") or generated locally. Based upon a common reference such as a PPS signal, interrupts can be generated at the same time within multiple computers despite each individual computer having its own imperfect clock. The interrupts can be generated within the computers at intervals shorter than the PPS signal. Multiple GPS receivers can each provide a PPS signal, and a consensus time point based upon the PPS signals can be used for coordinating the activities of the computers. A local PPS generator can be used by the computers if the GPS PPS signal becomes unavailable.

DETAILED DESCRIPTION OF THE PREFERRED EMBODIMENT

Figure 1:
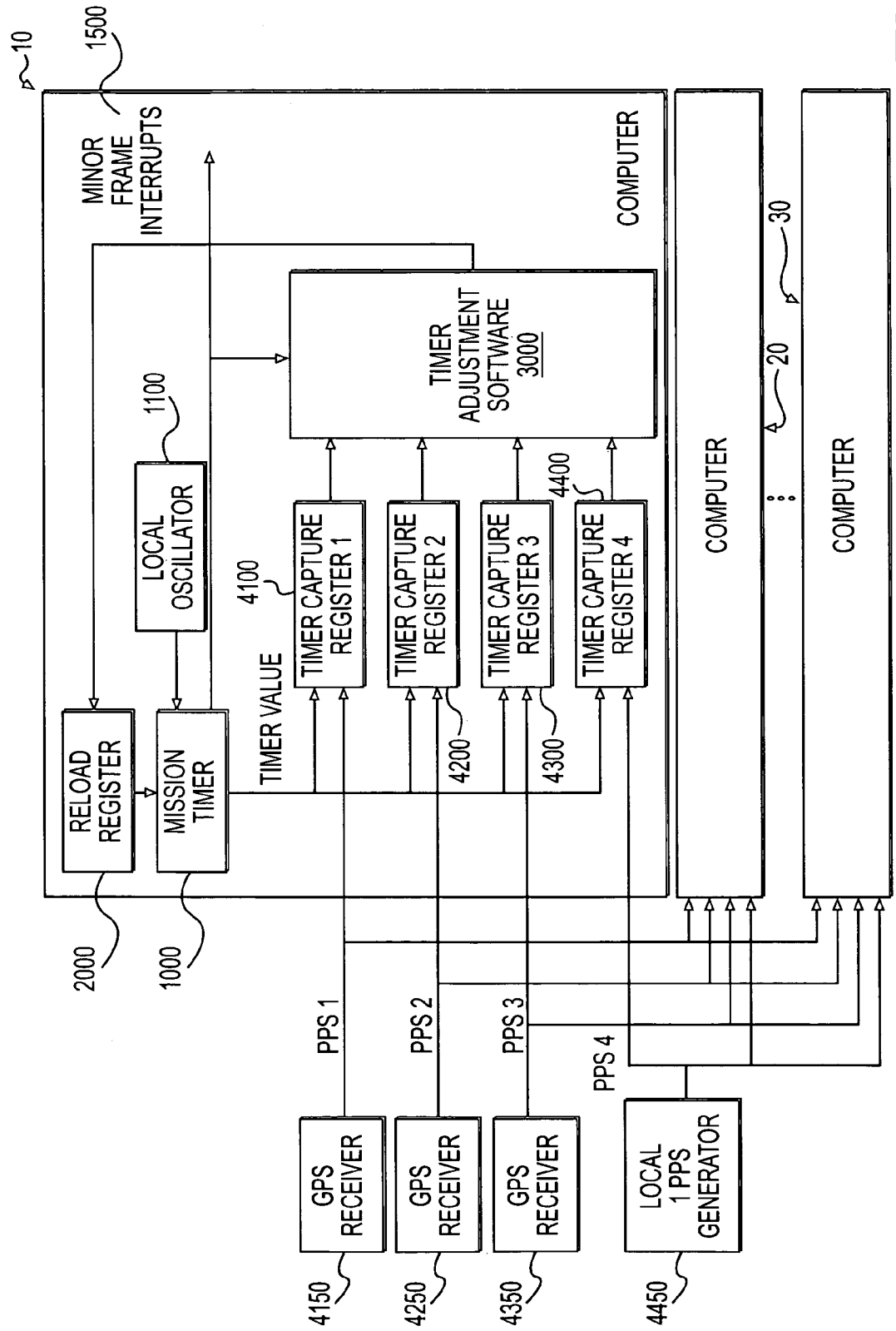
FIG. 1 is an overall schematic diagram of the present invention.

Referring to FIG. 1, an apparatus according to the present invention comprises GPS receiver 4150 and computer 10 having a mission timer 1000 that generates interrupts 1500, a reload register 2000 that transmits a reload value to mission timer 1000, timer capture register 4100 that receives a PPS signal from GPS receiver 4150, and timer adjustment software 3000. The present invention may further comprise timer capture register 4200, GPS receiver 4250, timer capture register 4300, GPS receiver 4350, timer capture register 4400, and local PPS generator 4450.

1. Mission Timer

Referring to FIG. 1, computer 10 has a mission timer 1000. Mission timer 1000 generates interrupts 1500 that may be used to synchronize the internal operations of computer 10 with an external signal, such as a GPS PPS signal. Computers 20 and 30 also may include a mission timer (not shown). The mission timers (not shown) on computers 20 and 30 function in the same manner as mission timer 1000. Using such mission timers, the internal operations of computers 20 and 30, and any other associated computer, may be synchronized to one another.

Figure 2:
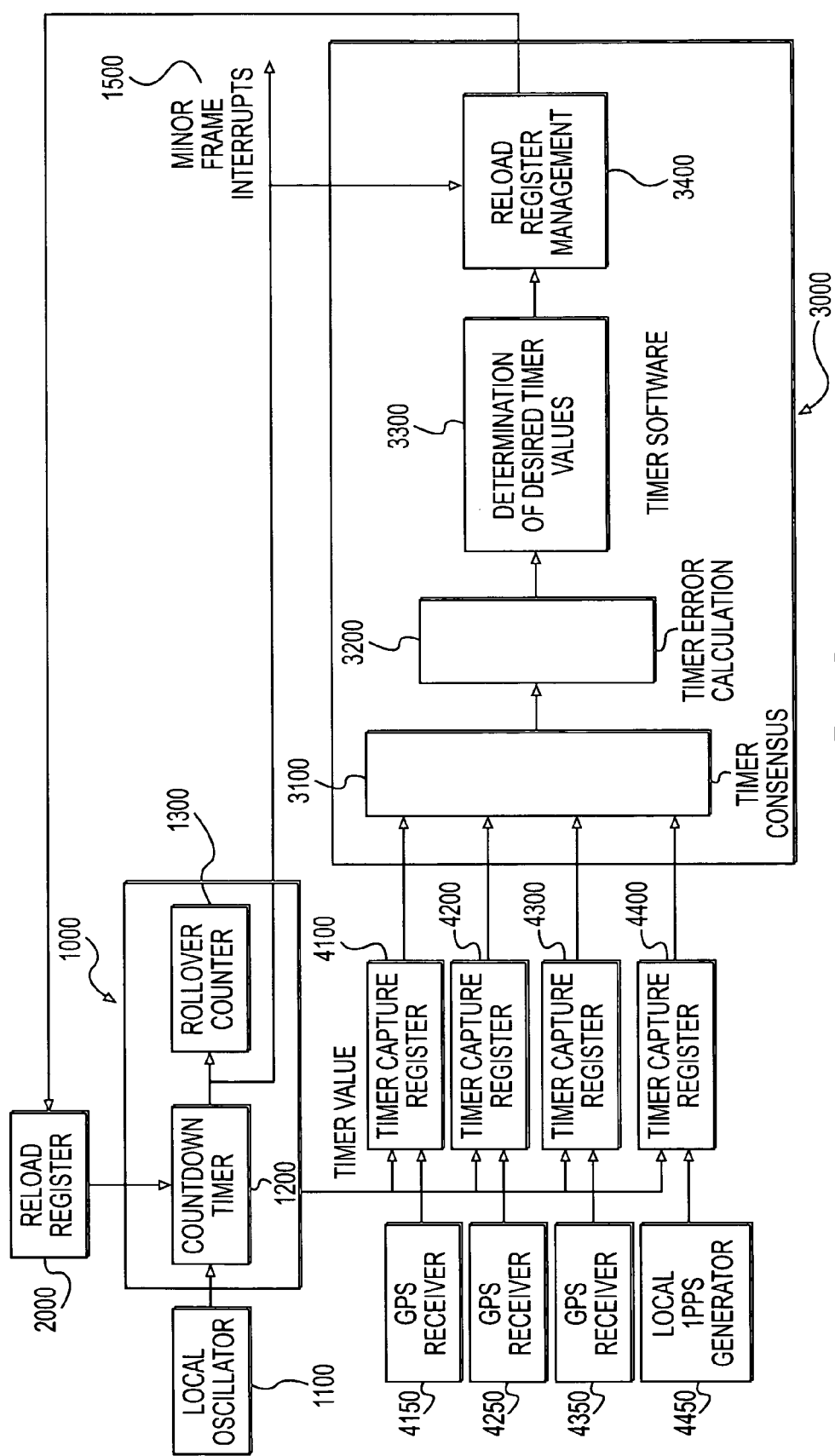
FIG. 2 is a detailed schematic diagram of one computer according to the present invention.

Mission timer 1000 operates by counting down the clock signal from local oscillator 1100. Oscillator 1100 may operate at any appropriate clock rate. Referring now to FIG. 2, mission timer 1000 comprises a countdown timer 1200 and a rollover counter 1300. Countdown timer 1200 decrements with each clock tick generated by local oscillator 1100 and reloads a reload value from reload register 2000 when a count of zero is reached. Also, when a count of zero is reached by countdown timer 1200, a maskable interrupt 1500 is generated. Interrupt 1500 may be used to synchronize the internal operations of computer 10. Rollover counter 1300 counts the number of times that countdown timer 1200 counts down to zero in a given interval. In an alternative embodiment, countdown timer 1200 may use an incrementing timer rather than a decrementing timer.

When an independent reference time point is available, such as the GPS PPS signal, mission timer 1000 may be used to measure the frequency of local oscillator 1100 by counting the number of cycles of local oscillator 1100. When measuring the frequency of local oscillator 1100, mission timer 1000 uses a capture register (not shown) that reads a timer value at the time of a transition on an external signal such as a PPS signal.

2. Generating Reload Values

Mission timer 1000 generates interrupts 1500 based upon reload values transmitted from reload register 2000. Each time mission counter 1000 counts out (typically when zero is reached), mission timer 1000 loads a new reload value from reload register 2000. The following is a discussion of how such reload values are generated.

Generation of the reload values is based upon alignment with a PPS signal. While the present invention could distribute a PPS signal directly as a 1 Hz interrupt, the use of one or more of timer capture registers 4100, 4200, 4300, and 4400 and modification of reload values to align interrupts in multiple units to a scale shorter than the PPS signal is a preferred embodiment of the present invention. The use of timer capture registers 4100, 4200, 4300, and 4400 is discussed later.

Figure 3:
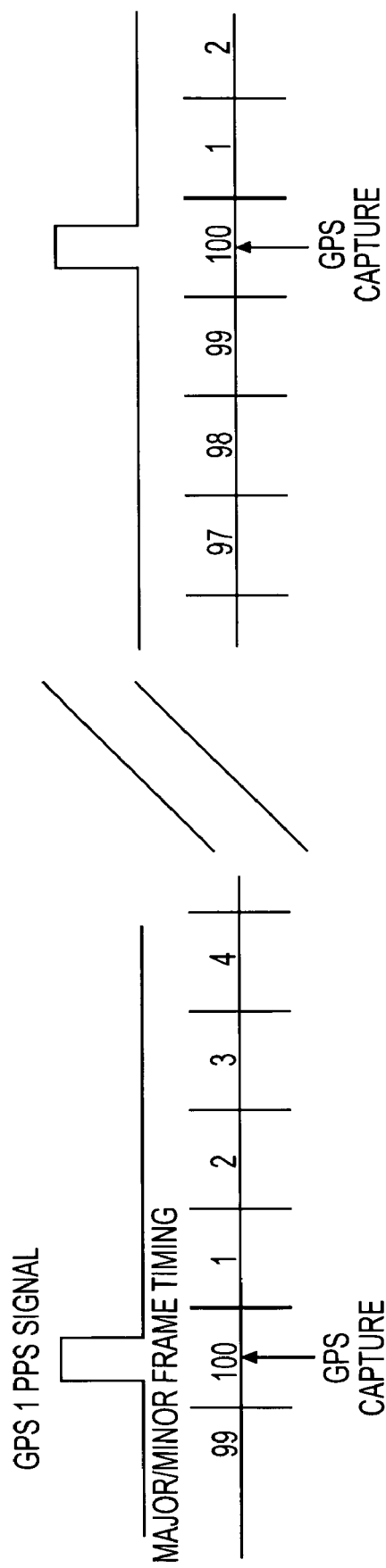
FIG. 3 is a schematic diagram of GPS timing alignment according to the present invention.

In one embodiment of the present invention, timer adjustment software 3000 can be used to generate reload values at a desired frequency, typically between 10 Hz and 100 Hz. These reload values are transmitted from reload register 2000 to mission timer 1000. By generating reload values for a time period of 10 ms, an interrupt could be generated by mission timer 1000 every 10 ms for use in sequencing software activities. In terms often used by real time cyclic systems, a 1 second period would be called a major frame, and a 10 ms period would be called a minor frame. Accordingly, there would be 100 minor frames in a major frame, numbered from 0 to 99 or 1 to 100, as shown in FIG. 3. It is preferable for the minor frame 100 to occur at the same time in the computers whose activities are being coordinated, such as computers 10, 20, and 30, so that interrupts will occur at the same time in the computers.

As an example, to generate a 100 Hz minor frame system when local oscillator 1100 has a nominal clock rate of 1 MHZ, mission timer 1000 uses nominal reload values of 10,000 (10 ms nominal). Referring to FIG. 3, when the PPS signal is asserted, the value of countdown timer 1200 (shown in FIG. 2) is captured. The point at which the PPS event is maintained can be anywhere within the major frame, but it is preferable that the point at which the PPS event is maintained is halfway through the last minor frame, for example, minor frame 100 shown in FIG. 3. In this example, the desired value of countdown timer 1200 when the PPS signal is asserted would be nominally 5,000 (i.e., halfway through a 10,000 count minor frame).

At the beginning of the next minor frame (here, the beginning of minor frame 1), a reload register management function 3400 of software 3000 reads the value of countdown timer 1200 captured when the PPS signal was asserted in minor frame 100. In this example, software 3000 computes the countdown timer 1200 error from the desired countdown timer 1200 value of 5,000. Based upon this error, reload register 2000 values for each minor frame are adjusted to bring the point at which the PPS signal is asserted to the desired point at the end of the next major frame. For example, if a one second count of 1,000,027 was the last value used, and countdown timer 1200 had run long by 7 counts, a value of 1,000,020 would be used for the next second, divided up among the 100 minor frames. To achieve greater accuracy according to the present invention, when dividing errors among the minor frames, round-off errors cannot be ignored, and round-off residuals must not accumulate.

Although using the right number of counts to predict the next point at which the PPS signal will be asserted will remove phase errors quickly, it is not mathematically stable. It is necessary to calculate the frequency of local oscillator 1100, and use the frequency of local oscillator 1200 as part of the determination of the count to be used for the next second. The correction applied adjusts both phase and frequency, but the frequency is adjusted on a longer time scale in order to provide a higher precision estimate of the local oscillator frequency.

The following is an example of an algorithm that could be used to correct phase errors:

Count(*N*+1)=Frequency Estimate(*N*)+*A*\*(Error(*N*))

Frequency Estimate(N+1)=Frequency Estimate(*N*)+ *B*\*(Error(*N*)−Error(*N*−1))

Values of A=1 to 1.25 and B=0.1 appear to work reasonably well.

As would be known to those skilled in the art, other equations and other parameters derived from standard control theory may also be used instead of the above equations. Different equations and different parameters will affect the performance of the present invention, such as how quickly the system aligns with the PPS signal.

If the GPS PPS signal should become unavailable, mission timer 1000 will continue to generate interrupts based upon the reload values from reload register 2000. The reload values can be adjusted based on the last known local oscillator 1100 frequency, but the system will eventually begin to drift. The frequency of local oscillator 1100 generally can be measured to an accuracy of 1/N ppm, where N is the time constant of the oscillator correction process. The clock will then start drifting at that rate, so the accuracy after A seconds will be A/B microseconds. As an example, if local oscillator 1100 is observed for 10 seconds, forming a 0.1 part-per-million measurement, after 100 seconds it may have drifted by 10 microseconds, just due to errors of measurement and extrapolation.

While aligning a minor frame boundary with the PPS signal could be done according to the present invention, it is preferable to maintain the PPS event within a minor frame, as described above. If the PPS event was maintained at the edge of a minor frame, half of the values of counter timer 1200 captured when the PPS signal is asserted would be in the next minor frame, after counter timer 1200 had received another reload value from reload register 2000. Because the present invention may use different reload values to coordinate the activities of multiple computers, the present invention would have to keep track of the reload values in order to calculate the error of local oscillator 1100 if the PPS event was maintained at the edge of a minor frame.

As described above, every time countdown timer 1200 counts out, it loads a new value from reload register 2000 for the next count down period. In a preferred embodiment of the present invention, to achieve the highest accuracy, the reload values generated by software 3000 may vary from one period to the next. This can be done in several ways.

The first way, and a preferred embodiment since it uses the least hardware, is for software 3000 to react to every minor interrupt and place a new reload value into reload register 2000 to be used the next time countdown timer 1200 rolls over.

A second way would be to have software 3000 generate a sequence of reload values once per second, and to load all of these reload values into a hardware table (not shown). Hardware would advance to the next entry in the table every time the countdown timer 1200 reached zero.

A third way would be for software 3000 to generate a fractional reload value once per second, and then use hardware (not shown) to adjust the reload value every time that counter timer 1200 rolls over. This fractional reload value would consist of upper bits that represent whole countdown timer 1200 ticks and lower bits that represent a fraction of one countdown timer 1200 tick. Likewise, countdown timer 1200 would consist of upper bits that get decremented and lower bits that do not get decremented. Hardware (not shown) would add the fractional reload value to countdown timer 1200 value when the decrementing portion of countdown timer 1200 reached 0. This addition would sometimes result in a carry bit propagating from the lower bits to the upper bits, such that countdown timer 1200 would count one more tick between roll overs than if there were no carry.

The following is an example of using fractional reload values if the desired countdown timer 1200 count was 12.4. On the first cycle, countdown timer 1200 would count for 12 ticks and then rollover. The residual value of countdown timer 1200 would be 0.4 when it rolled over. At the rollover, 12.4 would be added to countdown timer 1200, resulting in a value of 12.8. In the second period, countdown timer 1200 would again count down for 12 ticks, leaving a residual of 0.8. After adding 12.4 again, countdown timer 1200 would contain 13.2, and this time countdown timer 1200 would count for 13 ticks, leaving a residual of 0.2. When continuously repeated, the average countdown timer 1200 count out period would approximate the desired 12.4. The maximum error would be less than one timer tick.

3. Timer Capture Register

Computers whose activities are being coordinated according to the present invention such as computers 10, 20, and 30 utilize either a GPS PPS signal or an internally generated PPS signal to coordinate activities. GPS receiver 4150 is used by computer 10 to receive the GPS PPS signal for coordinating activities. Computer 10 may also use GPS receivers 4250 and 4350 to receive additional GPS signals. In addition, local PPS generator 4450 may be used by computer 10 when GPS signals become unavailable.

Timer capture registers are used according to the present invention to capture the value of countdown timer 1200 when a PPS signal is asserted. Referring to FIG. 2, timer capture register 4100 captures the value of countdown timer 1200 when a PPS signal is received from GPS receiver 4150. Timer capture register 4200 captures the value of countdown timer 1200 when a PPS signal is received from GPS receiver 4250. Timer capture register 4300 captures the value of countdown timer 1200 when a PPS signal is received from GPS receiver 4350. Timer capture register 4400 captures the value of countdown timer 1200 when a PPS signal is received from local PPS generator 4450.

Each computer whose activity is being coordinated typically will receive from one to three PPS synchronization signals from the GPS receivers. In addition, each computer whose activities are being coordinated typically will receive from at least one GPS receiver a serial message indicating the universal time ("UTC"). Each computer typically will slave the generation of interrupts from mission timer 1200 to the PPS signals, such that a major frame begins at the same absolute time in every computer. If some of the GPS PPS signals are missing, the computers whose activities are being coordinated will use the signals that are present to generate interrupts. If the GPS serial message is missing, the computer will use information from the other computers to determine UTC.

The activities of the computers are coordinated by basing the interrupts generated by mission timer 1000 of each computer upon a PPS signal. By adjusting the reload values used by mission 1200 independently in each computer, the interrupts in each computer can be aligned, ever though the countdown timer 1200 of each computer is driven by a different local oscillator 1100. As described above, the reload values used by mission timer 1200 are adjusted to compensate for any errors in local oscillator 1100.

When GPS receiver 4250 and GPS receiver 4350 are used in addition to GPS receiver 4150, the GPS PPS signal can be received in a fault tolerant manner. Software may be used to examine the values captured by timer capture registers 4100, 4200, and 4300 to determine a consensus value, such as an average, as a best estimate of true time. While each computer captures the PPS signals independently, if they all use the same algorithm for forming a consensus value, they will choose the same best estimate of true time. The process for determining a consensus value can include disallowing missing or obviously erroneous PPS signals. In this manner, the computers can remain synchronized even if all GPS signals are not available.

Local PPS generator 4450 can be included in the present invention to maintain synchronization among computers in the case that all GPS receivers are not working properly. Since local PPS generator 4450 is unlikely to be exactly at 1 pulse-per-second, the system time alignment will drift with respect to UTC. Using a typical short term drift of 1 part-per-million, it will take at least 100 seconds before a computer is off from UTC by 1% of a typical minor frame (0.1 ms). However, since the signal is provided to all computers, the computers will remain synchronized with each other.

There are two preferred embodiments of local PPS generator 4450. In one embodiment, local PPS generator 4450 is associated with a GPS receiver, and only provides a signal when the GPS receiver is not receiving signals from the GPS satellites. Such a PPS generator would actively align its PPS signal with the GPS derived PPS signal when the GPS signal was available, such that switching from the GPS PPS to the locally generated PPS would not perturb the system. Even if there are several such PPS signals that are drifting slowly with respect to each other, as long as each computer used the same time consensus algorithm, the computers would remain in relative synchronization.

In a second embodiment, local PPS generator 4450 is independent of the GPS receivers. The locally generated PPS signal will be expected to drift slowly with respect to the GPS derived PPS signals due to inaccuracies in the clock oscillator of the local PPS generator. While the GPS signals are available, local PPS generator 4450 would be measured for time offset and actual period, using a separate timer capture register to compare to the GPS derived PPS signals. When the GPS signals became unavailable, the timing adjustment algorithm would incorporate this known offset in determining the timing error and subsequent correction. Information about the offset and the local PPS actual period could be exchanged among the several computers to allow finer adjustment, but all computers must end up with the same offset and actual period values in order to maintain synchronization.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A system for coordinating the activities of one or more computers, comprising:
    a reload register adapted to transmit a reload value;
    a mission timer adapted to generate timer count values and to selectively generate an interrupt signal based upon said reload value transmitted from said reload register;
    a first timer capture register adapted to capture a first timer count value when a first PPS signal is received; and
    a second timer capture register adapted to capture a second timer count value when a second PPS signal is received; and
    software adapted to generate a consensus PPS value based upon said first timer count value and said second timer count value and to generate said reload value based upon said consensus PPS value;
    wherein the one or more computers are configured to synchronize based at least partially on said reload value.

2. The system as recited in claim 1, wherein said first PPS signal is generated by a local PPS signal generator.

3. The system as recited in claim 1, wherein said second PPS signal is generated by a local PPS signal generator.

4. The system as recited in claim 1, wherein a period of the interrupt signal is less than one second.

5. The system as recited in claim 4, wherein the period of the interrupt signal is approximately 10 ms.

6. The system of claim 1, further comprising a computer adapted to be synchronized based on said consensus PPS value.

7. The system of claim 1, further comprising synchronizing a computer based on said interrupt signal.

8. A method for coordinating the activities of one or computers, comprising:
- capturing a first timer count value with a first timer capture register when a first PPS signal is received;
- capturing a second timer count value with a second timer capture register when a second PPS signal is received;
- generating a consensus timer count value based upon the first captured timer count value and the second captured timer count value;
- generating a reload value based upon the consensus timer count value; and
- generating an interrupt signal based upon the reload value;
- wherein the one or more computers are configured to synchronize based at least partially on said interrupt signal.

9. The method as recited in claim 8, wherein a period of the interrupt signal is less than one second.

10. The method as recited in claim 9, wherein the period of the interrupt signal is approximately 10 ms.

11. A system for coordinating the activities of one or more computers, comprising:
- a reload circuit adapted to transmit a reload value;
- a mission circuit adapted to generate timer count values and to selectively generate an interrupt signal based upon said reload value transmitted from said reload circuit;
- a first timer capture circuit adapted to capture a first timer count value when a first PPS signal is received; and
- a second timer capture circuit adapted to capture a second timer count value when a second PPS signal is received; and
- software adapted to generate a consensus PPS value based upon said first timer count value and said second timer count value and to generate said reload value based upon said consensus PPS value;
- wherein the one or more computers are configured to synchronize based at least partially on said reload value.

12. The system as recited in claim 11, wherein said first PPS signal is generated by a local PPS signal generator.

13. The system as recited in claim 11, wherein said second PPS signal is generated by a local PPS signal generator.

14. The system as recited in claim 11, wherein a period of the interrupt signal is less than one second.

15. The system as recited in claim 11, wherein the period of the interrupt signal is approximately 10 ms.

16. The system of claim 12, further comprising a computer adapted to be synchronized based on said consensus PPS value.

17. A method for coordinating the activities of one or computers, comprising:
- capturing a first timer count value with a first timer capture circuit when a first PPS signal is received;
- capturing a second timer count value with a second timer capture circuit when a second PPS signal is received;
- generating a consensus timer count value based upon the first captured timer count value and the second captured timer count value;
- generating a reload value based upon the consensus timer count value; and
- generating an interrupt signal based upon the reload value;
- wherein the one or more computers are configured to synchronize based at least partially on said interrupt signal.

18. The method as recited in claim 17, wherein a period of the interrupt signal is less than one second.

19. The method as recited in claim 18, wherein the period of the interrupt signal is approximately 10 ms.

* * * * *